United States Patent
Darabi et al.

(10) Patent No.: US 6,443,704 B1
(45) Date of Patent: Sep. 3, 2002

(54) ELECTROHYDRODYNAMICLY ENHANCED MICRO COOLING SYSTEM FOR INTEGRATED CIRCUITS

(76) Inventors: Jafar Darabi, 8767 Contee Rd. #303, Laurel, MD (US) 20708; Michael M. Ohadi, 9533 Clocktower La., Columbia, MD (US) 20708

( * ) Notice: Subject to any disclaimer, the term of this patent is extended or adjusted under 35 U.S.C. 154(b) by 0 days.

(21) Appl. No.: 09/798,321

(22) Filed: Mar. 2, 2001

(51) Int. Cl.$^7$ ............................................. H02K 44/00
(52) U.S. Cl. ......................... 417/50; 417/48; 417/53
(58) Field of Search ............................ 417/48, 50, 53; 165/80.4, 96, 104.23, 104.24

(56) References Cited

U.S. PATENT DOCUMENTS

| | | | | |
|---|---|---|---|---|
| 3,267,860 A | * | 8/1966 | Brown | 417/48 |
| 4,316,233 A | * | 2/1982 | Chato et al. | 417/48 |
| 4,651,806 A | * | 3/1987 | Allen et al. | 165/96 |
| 5,180,288 A | * | 1/1993 | Richter et al. | 417/53 |
| 5,454,472 A | * | 10/1995 | Benecke et al. | 209/127.1 |
| 5,632,876 A | * | 5/1997 | Zanzucchi et al. | 417/50 |
| 5,769,155 A | * | 6/1998 | Ohadi et al. | 165/96 |
| 5,788,819 A | * | 8/1998 | Onishi et al. | 417/50 |
| 6,149,789 A | * | 11/2000 | Benecke et al. | 204/547 |
| 6,260,579 B1 | * | 7/2001 | Yokota et al. | 417/50 |

OTHER PUBLICATIONS

J. Seyed–Yagoobi & J. E. Bryan, 1996, Lyndon B. Johnson Space Center, Electrohydrodynamic Pumping Enhances Operation of Heat Pipe, 7 pages.*

D. A. Saville, 1999, Princeton Univ., [DG.05] Electrohydrodynamic Pumping: Flow Near a Cylinder in a Uniform Electric Field, 5 pages.*

Valdosta Univ., Mar. 1, 2002, Valdosta Univ., Electrochemical Methods, 3 pages.*

Electrokinetics, Inc, Mar. 23, 1960, Electrokinetics, Inc., Electrohydrodynamics, 3 pages.*

S.F. Bart, et .al.; Microfabricated Electrohydrodynamic Pumps Sensors and Actuators; A21–23 (1990) 193–197.

A. Richter, et .al.; A Micro Machined Electrohydrodynamic Pump Sensors and Actuators; 29 (1991) 159–168.

Gunter Fuhr, et .al. Micromachined Electrohydrodynamic Pumps for Liquids of Higher Conductivity ;Journal of Electromechanical Systems; vol. #1; #3; Sep. 1992.

Gunter Fuhr et .al.; Traveling Wave Driven Microfabricated Electrohydrodynamic Pumps for Liquids; Micromechanical Microengineering; V4(1994)217–26.

Jin–Woo Choi, et .al.; Microelectrodynamic Pump Driven by Traveling Electric Field; Copyright 1995 IEEE; pp. 1480–1483.

* cited by examiner

Primary Examiner—Cheryl J. Tyler
Assistant Examiner—John F Belena
(74) Attorney, Agent, or Firm—Daniel Kramer

(57) ABSTRACT

A cooling system employing Micro Electro Mechanical System (MEMS) technology and polarization principles to move a cooling fluid over a surface requiring cooling and further employing electrohydrodynamic principles for the purpose of enhancing the heat transfer coefficient between the cooling fluid and the surface to be cooled.

26 Claims, 4 Drawing Sheets

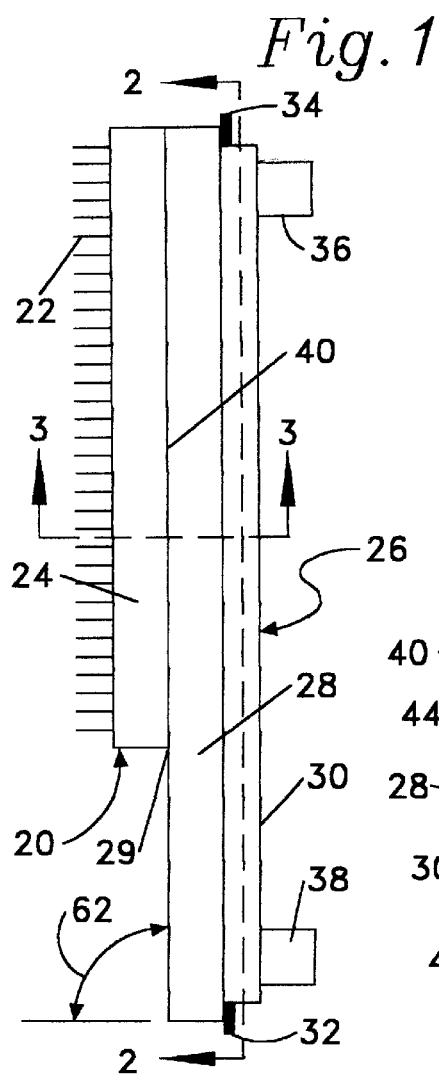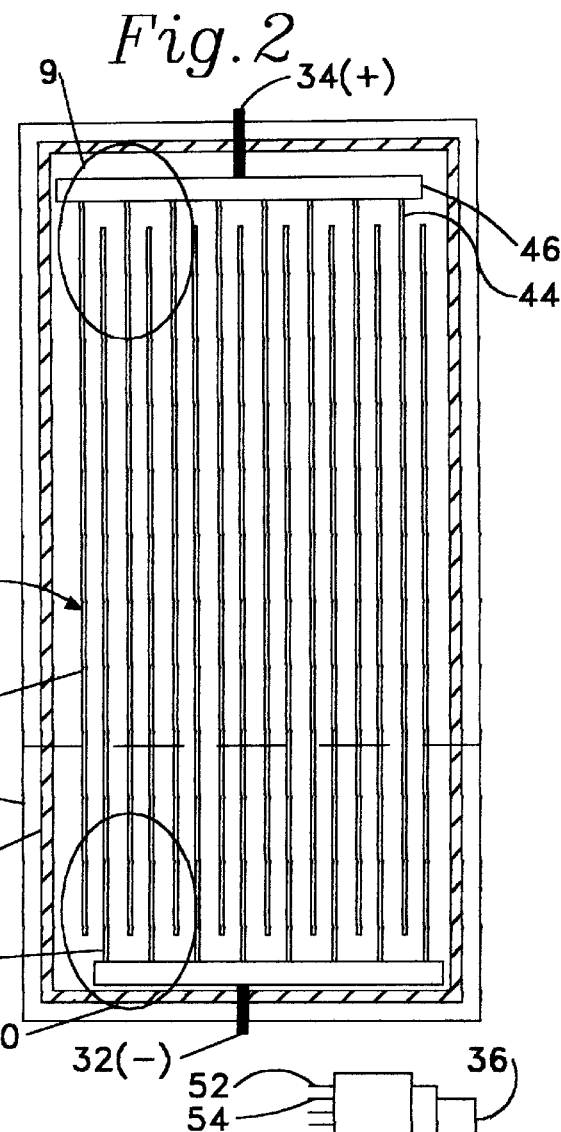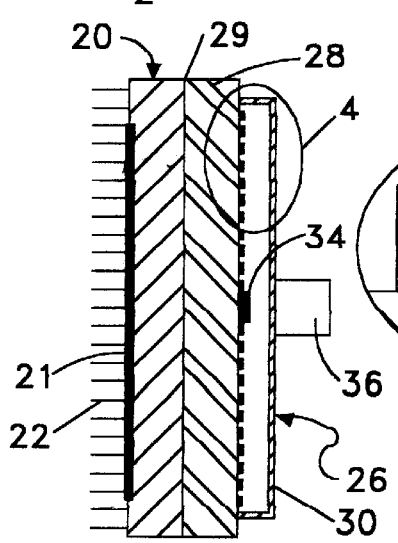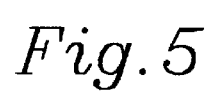
Fig. 1
Fig. 2
Fig. 3
Fig. 4
Fig. 5

ELECTROHYDRODYNAMICLY ENHANCED MICRO COOLING SYSTEM FOR INTEGRATED CIRCUITS

BACKGROUND

Integrated circuits (ILC) utilize micro-components that require electrical energy. Neither the micron sized conductors nor the micro-components are 100 percent efficient. Both convert some of the electrical energy used in their computations into heat. In the early versions of these integrated circuits having relatively few components per unit area, natural convection cooling proved adequate to limit the operating temperatures to safe values. As technology allowed packing more components into an integrated package the heat generated required motor driven fans mounted directly on the IC packages, thereby providing forced convection cooling, to control the package temperature. The manufacturers have even provided finned surface extenders to be mounted to the IC packages with a heat conducting paste to better dissipate the IC package heat to the fan forced air stream. All of these heat dissipation schemes have employed macro-cooling methods to cool micro components.

Significant increases in component density and accompanying heat dissipation rates have acted to raise operating temperatures of the IC packages to such levels that their operating life can be endangered and in the alternative to limit the heat dissipation rates, thereby limiting the ultimate capability of the IC package.

The current invention is directed to micro means for sharply improving the coefficients of heat transfer between the coolant and the IC and for providing improved means for removing heat generated by an IC. The proposed micro pump and heat exchanger allows present high density ICs to operate at lower temperature, thereby providing longer life. The present invention, by providing sharply improved flow and heat transfer over the heat dissipation area further has the capability of allowing future ICs to be manufactured with higher component densities and to operate at higher heat dissipation levels without exceeding life threatening component temperatures.

This system offers several features including; 1) applying the electric field directly to the heat transfer surface using MEMS (Micro Electronic Mechanical Systems, technology to provide ultra thin liquid films; 2) providing the required pumping action to bring the working fluid to the heat transfer surface; and 3) increasing the effective heat transfer coefficient at the heat transfer surface by thin-film evaporation. Each electrode typically has a thickness of 0.3 $\mu$m to 10 $\mu$m and a width of 2 $\mu$m to 50 $\mu$m. The gap between the electrodes depends on the design and application and may vary over the range from 2 $\mu$m to 100 $\mu$m.

A typical fabrication sequence is described below. However, it is expected that more modern and rapid manufacturing sequences will be developed or applied to the process to secure the desired arrangement of the electrodes. Therefore, it is emphasized that the novelty of the invention lies in the use of the micro-electrode arrangement to achieve polarization priming of the cooling fluid and the application of an electric field through the micro electrodes to improve the heat transfer coefficients over the heat transfer area.

Typical fabrication begins with wafer or substrate premetalization cleaning. The substrate is typically quartz but sapphire or other similar material may be employed. After cleansing, 300 Å thickness Chromium and 2500 Å thickness Platinum (1Å=0.0001 $\mu$m) is deposited using an e-beam evaporator. A 1.5 $\mu$m thick layer of photo resist is applied over the deposited metals followed by a soft bake at 100° C. Photolithography is employed to create the desired electrode pattern followed by a hard-bake at 120° C. While Ion beam-milling was employed, a variety of other etching techniques such as wet etchinq and deep reactive ion etching are available.

The Cr/Pt film is etched to give the heater and electrode patterns. Following the micro fabrication, the packaging is performed.

A preferred cooling fluid suitable for use in this invention that is highly subject to electrical polarization is a mixture of about 50 percent each of nonafluorolsobutylether and non-afluorobutylether offered by 3M Company located in St. Paul Minn. (1 800 364-3577) under the trade name HFE-7100 (dielectric constant k=7.4). This fluid has a typical boiling point at atmospheric pressure of 60C (~140F) and a viscosity of 0.23 CPS at 23C (73.4F). Among other useable fluids are those which have low electrical conductivity and dielectric constants in the range of 2 to 100. Examples of these are deionized (DI) water (k=78.5), HFC-134a (k=9.5), L-13791 (k=7.39) and methoxy nonafluorobutane ($C_4F_9OCH_3$).

PRIOR ART

The use of the electrohydrodynamic technique for microscale fluid pumping has been investigated by a number of researchers over the past half decade (Bart et al., 1990; Richter et al., 1991; Fuhr et al., 1992; Fuhr et al., 1994; Cho and Kim, 1995; and Ahn and Kim, 1997).

Bart discloses an EHD pumping principle employing a traveling electrical wave or charge imposed between electrodes positioned in a substantially parallel array whereby a non-electrically conducting fluid is moved transverse to the electrodes by a sinusoidally applied voltage. Bart points out that his principle works only if the electrodes are freely suspended within the fluid to be pumped and will not work if the electrodes are positioned against the surface to be cooled.

Richter et al. (1991) demonstrated a micro-machined ion-drag EHD pump consisting of pairs of facing permeable or perforated substantially planar grids through which the pumped fluid moves. Richter displays an array of pairs for increasing the pumping head. Richter points out (p. 160 col. 1) that the polarization or 'dielectrophoretic' force "cannot lead to a permanent fluid motion for DC fields . . . " Further, none of Richter's grids are in direct contact with any surface to be cooled.

Fuhr (1992, employs a arid of micro electrodes applied to a surface but teaches a single phase or poly-phase electrical alternating potential applied to his electrodes. Further, Fuhr's pumped fluid moves transversely to the electrodes.

Fuhr (1994) again teaches a traveling wave pumping design and suggests that a square wave format is superior to sinusoidal wave format. He further points out that traveling wave pumping principles require that the fluid pumped exhibit a gradient in the properties of electrical conductivity or permittivity, a characteristic not required by the present invention.

Chol (1995) teaches flow direction that is transverse to the electrode direction and the use of six phase AC as the driving potential.

Ahn (1997) teaches an ion-drag principle where the fluid flow is transverse the linear direction of the micro-electrodes.

The present invention is based on a polarization pumping principle. No previous work was found that addressed the use of EHD pumping based on polarization principles.

SUMMARY OF THE INVENTION

The invention discloses a micro pump for moving a cooling fluid over a heated surface to be cooled. The pump comprises an array of substantially parallel linear micro electrodes positioned on the hot surface. A conduit is provided enclosing the array and positioned to cause flow parallel to the direction of the electrodes. The conduit has an interior periphery including the hot electrode bearing surface. The electrodes are electrically connected in at least two groups and a voltage source is employed for applying a non reversing electromotive force between the electrode groups.

OBJECTS AND ADVANTAGES

An object of the invention is to provide low cost, easily applied means for circulating, without moving parts, a cooling fluid in heat transfer relation to a small surface requiring cooling.

A further object is to provide such means employing micro-electrodes that can be applied to the surface itself.

A further object is to provide such means that utilize fluid polarization principles.

A further object is to provide such means that require unusually small amounts of electrical power.

A further object is to provide such means that require only direct current energization and do not require single or multi-phase alternating currents for electrode energization.

A further object is to provide such circulating or pumping means for a fluid that evaporates on contact with the surface being cooled.

A further object is to provide such circulating means that includes means for applying an electric field directly to the surface being cooled. thereby improving the heat transfer coefficient between the cooling fluid and the surface.

A further object is to provide an active thin film evaporation and cooling process.

A further object is to deploy the pumping means over the cooled surface and over an adjacent surface and where the means for applying the electric field to the cooled surface is an extension of the micro-electrodes that comprise the pump.

A further object is to provide such circulating means to a surface positioned at an angle to the horizontal and especially where the fluid moves from a lower position on the surface to a higher position.

A further object is to position the cooled surface at a right angle to the horizontal.

A further object is to employ a closed circulating system for the fluid circulated.

A still further object is to employ a volatile liquid as the fluid circulated and to deploy an externally cooled condenser to condense vapor generated at the cooled surface to the liquid state for reuse at the cooled surface.

A further object is to provide 'gravity' circulating means for returning the condensed vapor to the surface.

A further object is to employ a second pump for facilitating the return of liquid from the condenser to the cooled surface.

A further object is to employ the principle of micro-electro-mechanical systems or MEMS to achieve the above objects.

Other equally important objects and objectives will be noted as the detailed exposition of the construction and usage of the invention is perused in the text below.

BRIEF DESCRIPTION OF THE DRAWINGS

FIG. 1 shows a side elevation of a plump and heat exchanger of the invention in heat transfer relationship to a heat producing integrated circuit package.

FIG. 2 is cross-sectional view 2 of device of FIG. 1 illustrating the gross internal electrode layout of the pump-heat exchanger of the invention.

FIG. 3 is cross section 3 of the device of FIG. 1 showing an end view of the pump-heat exchanger of FIG. 1.

FIG. 4 Illustrates, in gross, the electrode positioning within the flow channel.

FIG. 5 shows a pump-heat exchanger of the invention combined with a heat producing integrated circuit package.

DETAILED DESCRIPTION OF THE INVENTION

Figures 6, 7:
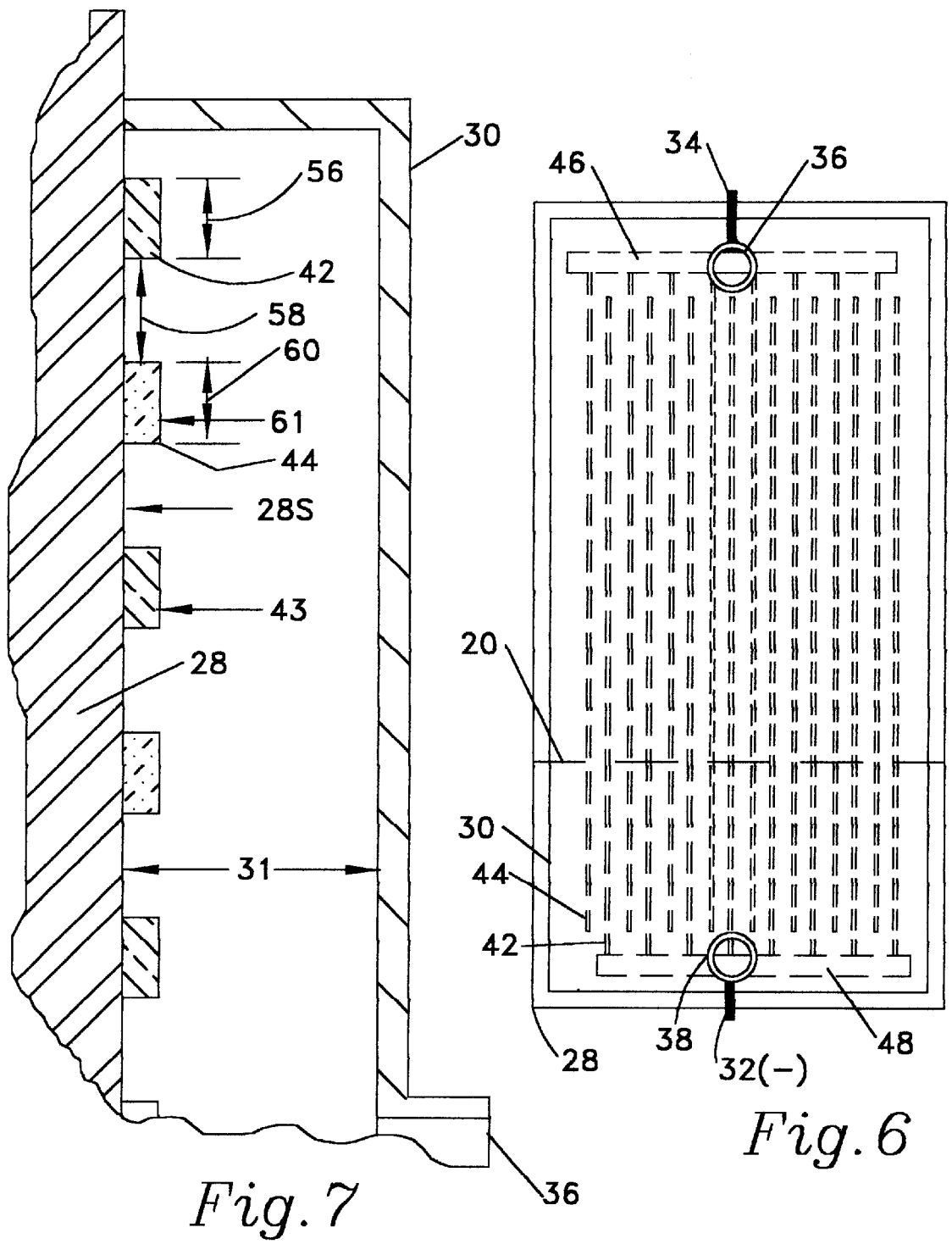
FIG. 6 is a plan view of the pump-heat exchange assembly showing the hidden electrodes
FIG. 7 is a highly enlarged cross section of the electrodes and their enclosure including typical electrode spacings and dimensions.

FIG. 1 a side elevation of an Integrated Circuit assembly (IC) in package 20 formed in an enclosure 24 and having a multiplicity of electrically connecting points 22 for providing power and information to the IC from a computer connected socket and for withdrawing from the IC information processed by it. In the process of performing its information or power processing function, heat is generated by the IC sealed within the enclosure 24 and the external surfaces of the IC 24 become hot.

The cooling system assembly of the invention 26 is thermally connected to the available hot surface of the IC package 24 on the package side opposite its pins 22. Typically the thermal connection is made by coating the surfaces to be thermally connected with a heat conducting grease and clamping or otherwise securing together (clamping means not shown) the IC 24 to be cooled and the cooling device 26, thereby forming a mechanical and thermal interface 29.

The cooling unit 26 has a sapphire substrate 28. Other materials may be employed for substrates including ceramic, single crystal quartz or silicon. The primary substrate requirements are low electrical conductivity rigidity and high thermal conductivity. On the surface 40 of the substrate 28 of the cooling unit 26 there are positioned a multiplicity of parallel micro-electrodes 42 and 44 (FIG. 2) to be described.

An enclosure 30 is provided for channeling cooling fluid over the micro-electrodes 42, 44. The enclosure 30 is bonded or otherwise sealed to the substrate 28. The enclosure 30 is provided with a fluid inlet 38 and a fluid outlet 36. The enclosure 30 has enclosing portions or walls that define a conduit having an internal periphery that includes the substrate surface on which micro electrodes 42, 44 are positioned. Each electrode 42, 44 has a direction, that direction being the direction of a straight line centrally positioned on the electrode and traversing it from end to end. (See also FIG. 2) While the electrodes here are described and shown as being straight, they are well adapted to being positioned in a curved or cylindrical surface and the description should be understood to apply to each surface to which such an array could be applied whether flat, curved, cylindrical, convex or concave. In a preferred mode, the substrate 28 is positioned so the direction of the micro electrodes is substantially vertical, that is at an angle 62 of about 90 degrees to the horizontal. It is intended that the terms vertical means "positioned at an approximate angle of 90 degrees to a plane defined by the surface of a quiescent body of liquid." Further discussion of this angle 62 will be found in connection with FIG. 8.

FIG. 1 displays two sectioning lines: 2—2 refers to a section shown in FIG. 2; 3—3 refers to a section shown in FIG. 3.

Referring now to FIG. 2 which is the section 2—2 of FIG. 1, there are displayed positioned on and fastened to the surface 40 of substrate 26, two separate arrays of micro electrodes; the nominally negative array having tie bar 48 and having connected thereto a series of micro elements 42, and the nominally positive array having tie bar 46 and having connected thereto a series of micro elements 44. The micro elements 42 and 44 are positioned in an interleaved fashion so that the micro elements 42 alternate with the micro elements 44. While the post negative tie bar 48 are positioned at opposite ends of the interleaved array, it is the clear intent of the inventors that the tie bars can be positioned wherever convenient, even at the same end of the interleaved array, laying one on top of the other and each insulated from the other.

Referring again to FIG. 2 there is shown in cross section the enclosure 30, substrate 28 on which the array is positioned and electrical leads 34 and 32, each connecting to its respective tie bar 46 and 48, whereby an appropriate electrical potential may be applied to the tie bars and their respective interleaved micro electrodes. In one typical construction the width of substrate 28, measured across the face of the array of micro electrodes is about 10 millimeters (mm) and the height measured from the end adjacent tie bar 46 to the end adjacent tie bar 48 is about 15 mm and the actual measurements of the interleaved micro electrode array positioned thereon, correspondingly smaller. Hidden line 20 identifies the edge of the IC assembly intended to be cooled.

The electrical potential needed to cause polarization of the preferred fluid depends, in part on the formation of the micro electrodes. However, a typical voltage is in the range of 50 to 200 V. While a uniform, substantially non-varying voltage performs well, it is within the scope of this disclosure that the voltage may be caused to vary while maintaining the same relative polarity between the electrodes. The voltage variation may be in the form of an impressed sine wave, a square wave or some other format. Further, a variation having a defined frequency such as 20 Hertz (Hz) or 60 Hz or a much higher frequency such as 1000 Hz may be preferred.

FIG. 3 is a cross section 3—3 of the structure of FIG. 1. FIG. 3 shows IC package 20 having casing 24 and pins 22 for providing information input and output and power input to the IC 21 kernel itself. It is the IC 21 kernel in which the heat generating micro electronics are located and which is sought to be effectively cooled by the micro pump and cooling unit 26 of the invention. As in FIG. 1, the heat transfer interface 29 between heat producing IC package 20 and the micropump-heat exchanger of the invention 26 is shown. On the surface 40 of substrate 28 of the pump-heat exchanger 25 are positioned the individual micro electrodes 42, 44 and one (34) of the two electrical connections required for actuating the micro pump. Enclosure 30 is shown providing a flow channel for cooling fluid. along with one 36 of its two outlet connections. In FIG. 3 the scale is too small to clearly identify the individual micro electrodes, but additional section 4—4 and FIG. 7, provide expanded views.

FIG. 4 is the oval section of FIG. 3. This section clearly shows the relative relations of the micro electrodes 40 and their specific interleaved identities 42 and 44 on substrate 28 and within flow enclosure 30.

In FIG. 5 there is shown a construction where a single substrate 50 provides a base for the micro electrodes within flow enclosure 30 and its fluid inlet 38 and outlet 36, and pins 22 for supplying and retrieving digital information and power to the IC kernel 21, not shown. Further pins 52 and 54 serve to supply the EMF required by the pump micro electrode assembly positioned within flow enclosure 30, thereby enabling a single integrally designed and constructed package to perform both functions.

FIG. 5 is a plan view of the construction of FIG. 2 showing the interleaved micro electrodes 42 and 44, the tie bars 46 and 48, their external electrical connections 32 and 34 and the flow enclosure 30 with its inlet connection 38 and outlet connection 36, all positioned on substrate 28. Hidden line 20 identifies the edge of the IC assembly intended to be cooled.

FIG. 7 shows a greatly enlarged cross section of a portion of the interleaved array of micro electrodes 42, 44. These are positioned on surface 28S of substrate 28 and are enclosed by flow enclosure 30 with its connection 36. The wall of the flow enclosure typically is spaced a distance 31 from the substrate and the micro electrodes. Distance 31 is typically about 3 mm, although, for different fluids and pumping requirements, other dimensions 31 can be employed.

In one preferred embodiment, micro electrodes 42 and 44 each have a width dimension 56, 60 of 10 $\mu$m and a thickness 43, 61 of 1 $\mu$m. In their interleaved array the alternating polarity micro electrodes are spaced 20 $\mu$m apart. In other embodiments, adapted for different heat transfer rates or different cooling fluids, other dimensions may be preferred. In one preferred embodiment the micro electrodes are formed of Gold or Platinum. In other embodiments, Niobium or a Niobium rich alloy is employed for micro electrodes.

Figure 8:
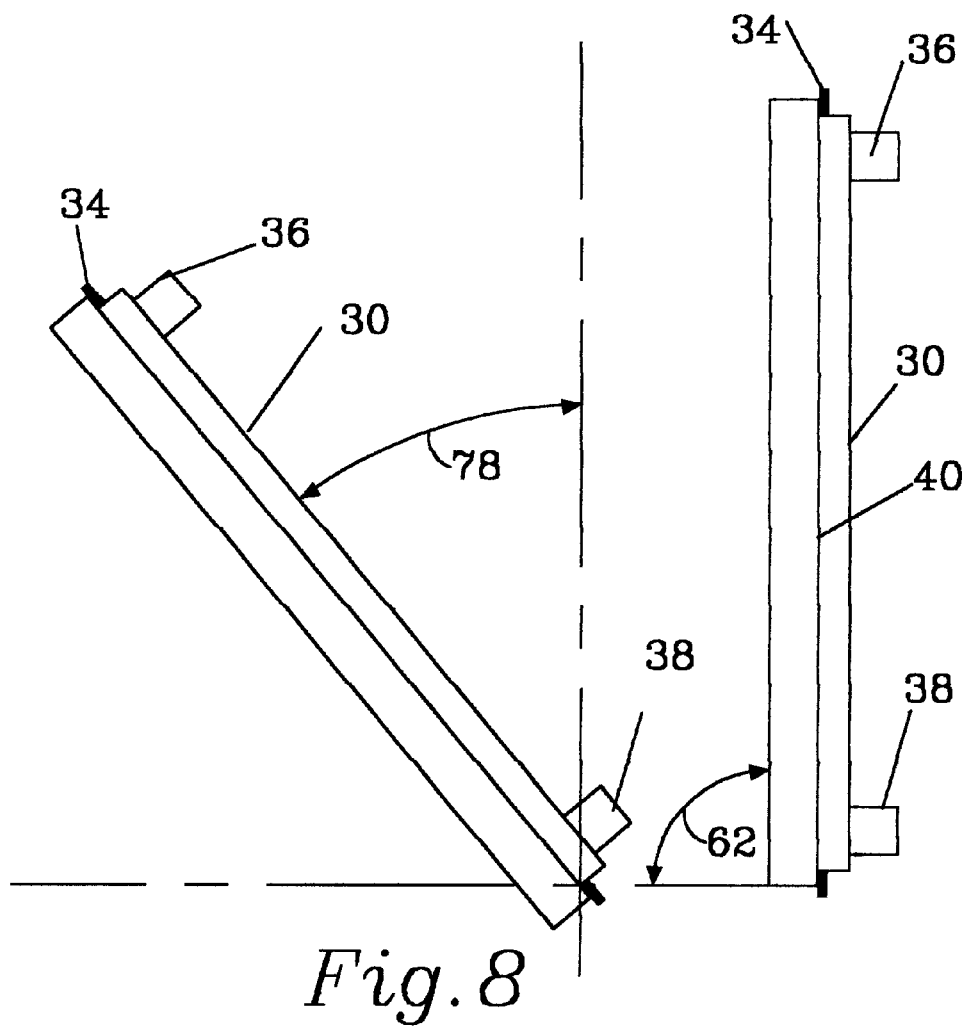
FIG. 8 shows the angular limits of effective performance of the assembly.

In FIG. 8 the substrate 28 bearing the micro electrodes of the invention is so positioned that the primary direction of the micro electrodes 40 is at a right angle 62 to the horizontal. While the pumping action on the cooling fluid that enters inlet 38 is effective without reference to the electrode direction, the pumping action is most effective when the electrodes cause flow in a substantially upward direction along the direction or axis of the micro electrodes. A preferred maximum deviation of the angle 78 of the assembly and the enclosed micro electrodes from the vertical is about 75 degrees.

Figure 9:
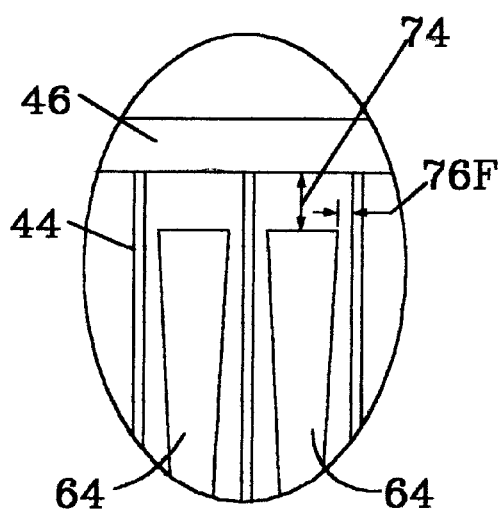
FIG. 9 and 10 show details of variations in electrode shape and spacing at the pump inlet and outlet.
Figure 10:
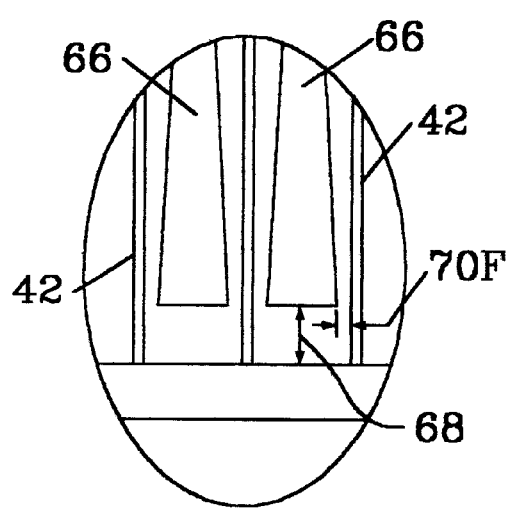

FIG. 9 and 10 are greatly enlarged sections of the structures illustrated in FIG. 2. In FIG. 9 there is shown micro element 64 whose width dimension varies linearly over its length so that the spacing between it and its adjacent micro electrode 44, or electrode of opposite electrical polarity, is reduced from its initial dimension 76I (not shown) to a final spacing dimension of 76F. In a preferred embodiment the dimension 76F is 0.833 of the initial dimension 76I. It is intended that this reduction in flow width and area between adjacent electrodes in the direction of flow be employed to intensify the polarization effect on the fluid remaining within the array in liquid form, as evaporation of the liquid cooling fluid occurs during the cooling process. In other embodiments, the width dimension varies in a non-linear manner in order to best conform with the characteristics of the cooling fluid and the rate of its evaporation in the cooling process. The distance 74 between the end of the electrode 64 and the tie bar 46 of opposite polarity is typically three times the initial electrode spacing 76I. Initial electrode spacings may vary over the range of 2 to 100 $\mu$m depending on the cooling fluid employed. The above preferred dimensions have been found to be satisfactory for the 50 percent mixture of nonafluoro-isobutylether and nonafluoro-butylether offered by 3M Company located in St. Paul Minn. (1 800 364-3577) under the trade name HFE-7100. This fluid has a typical boiling point at atmospheric pressure of 60C (~140F) and a viscosity of 0.23 CPS at 23C (73.4F). Among other useable fluids are pure (DI) water, HFC-134a and L-13791 and other fluids having low electrical conductivity and dielectric constants in the range of 2 to 100.

In FIG. 10 a similar variation in the width of electrode 66 is shown where the flow within the micro pump is in a downward direction. There the spacing 70F is reduced to a fraction, typically 83.3 percent of its initial 70I spacing dimension.

Figure 11:
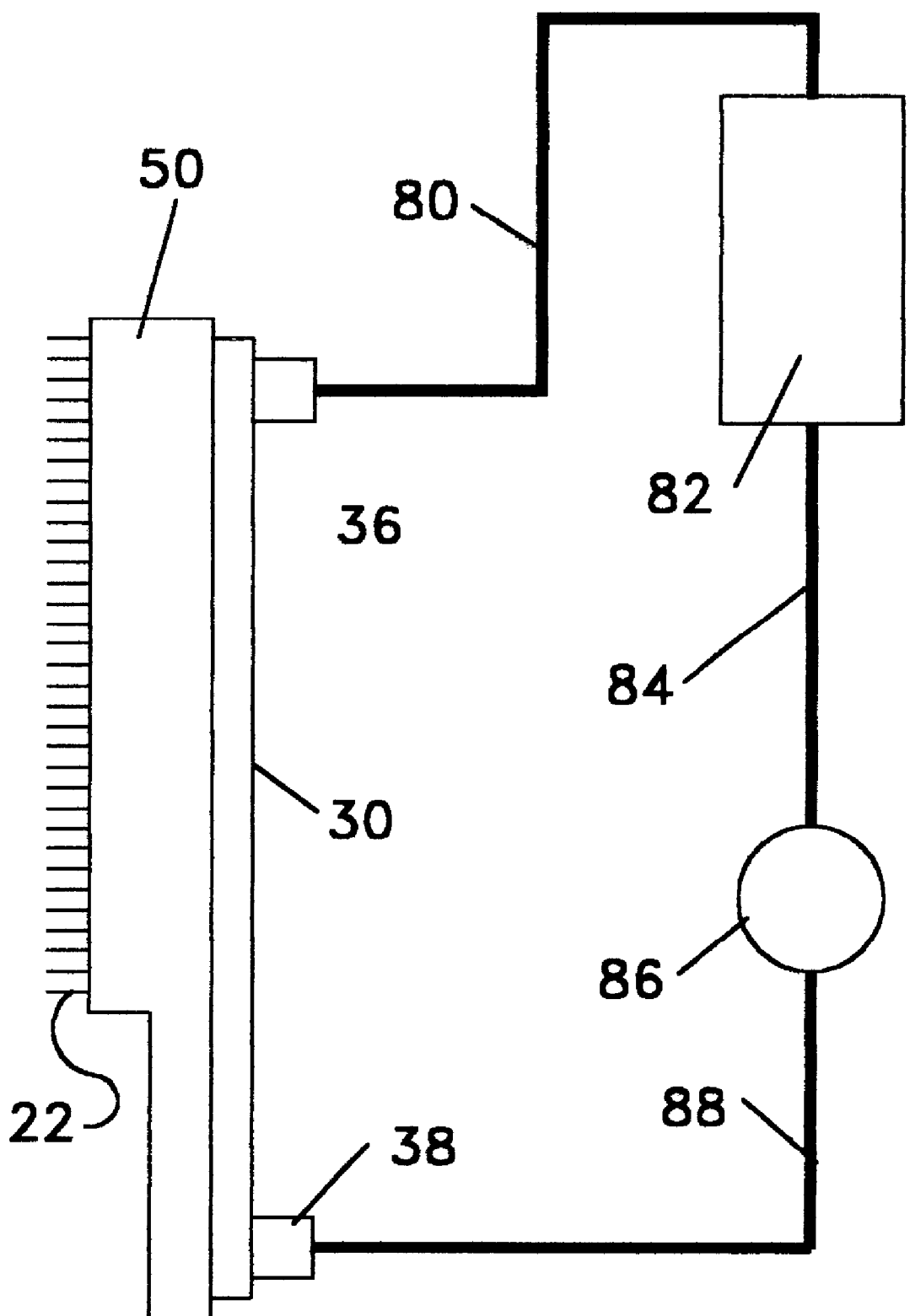
FIG. 11 shows one version of a potential cooling circuit employing a secondary external pump.

FIG. 11 displays the outline of a complete cooling system for the IC to be cooled. The combined IC/micro cooling system has the micro electrode array positioned under enclosure 30 and on substrate 50. Enclosure outlet 36 is connected by conduit 80 to condenser 82. While no cooling medium is shown affecting condenser 82, either air or liquid can be applied for this purpose. The condenser outlet conduit 84, 88 may be connected directly to inlet 38 of the micro heat exchanger assembly of the invention. However, where higher flows or where conduit flow resistance is encountered, an auxiliary micro electronic pump may be connected between conduits 84 and 88 to increase the head available for flow. It should be clearly understood that the principle illustrated in FIG. 11 applies equally well to the structures of figures other than that of FIG. 5 which is shown here in FIG. 11 for simplicity only.

From the foregoing description, it can be seen that the present invention comprises an advanced and unobvious construction for making and using a micro pump for pumping a fluid and an associated micro heat exchanger for cooling integrated circuits and other small heat generators. It will be appreciated by those skilled in the art that changes could be made to the embodiments described in the foregoing description without departing from the broad inventive concept thereof. It is understood, therefore, that this invention is not limited to the particular embodiment or embodiments disclosed, but is intended to cover all modifications and elements and their equivalents that are within the scope and spirit of the invention as defined by the appended claims.

We claim:

1. Means for moving a cooling fluid, said moving means comprising a surface and interleaved first and second arrays of substantially parallel linear microelectrodes positioned on the surface in a substantially vertical direction;

the moving means further including means for applying a sufficiently high non-reversing electromotive potential between the first and second arrays to create a polarization effect on the fluid, the first array thereby having a positive electrical potential with respect to the second array and the second array having a negative electrical potential with respect to the first array, whereby fluid is caused to flow along the lines of the microelectrodes, and enclosing means for channeling fluid flow along the microelectrode lines.

2. Means for moving a cooling fluid as recited in claim 1 further providing that the surface is positioned so that the direction of the lines of the linear microelectrodes and the corresponding direction of fluid flow lies between vertical and seventy five degrees away from vertical.

3. Means for moving a cooling fluid as recited in claim 1 further providing that the enclosing means confines the fluid within a distance of 3 millimeters from the electrodes.

4. Means for moving a cooling fluid as recited in claim 1, further providing that the applied electromotive potential is substantially constant.

5. Means for moving a cooling fluid as recited in claim 1 where the circulating fluid is mixture of about 50 percent each of nonafluoroisobutylether and nonafluorobutylether.

6. Means for moving a cooling fluid as recited in claim 1, where the circulating fluid is selected from fluids having low electrical conductivity and dielectric constants in the range of 2 to 100.

7. Means for moving a cooling fluid, said moving means comprising a surface having a heated portion and an unheated portion and interleaved first and second arrays of substantially parallel linear microelectrodes positioned on the surface and extending over both the heated and unheated surface portions, the moving means further including means for applying a sufficiently high non-reversing electromotive potential between the first and second arrays to create a polarization effect on the fluid, the first array thereby having a positive electrical potential with respect to the second array and the second array having a negative electrical potential with respect to the first array, whereby fluid is caused to flow along the lines of the microelectrodes, and enclosing means for channeling fluid flow along the microelectrode lines.

8. Means for moving a cooling fluid as recited in claim 7 further providing a fluid inlet to the confining means, said inlet positioned to cause flow over the unheated portion before flow over the heated portion.

9. Means for moving a cooling fluid as recited in claim 8 further providing a fluid outlet positioned to receive flow that has traversed at least part of the heated portion.

10. Means for moving a cooling fluid as recited in claim 9, further providing that the fluid is a volatile liquid that evaporates in traversing the heated portion and further providing that the vapor arising from evaporation exits the confining means through the fluid outlet.

11. Means for moving a cooling fluid as recited in claim 10, further providing conduit means external of the pump means for connecting the fluid inlet and the fluid outlet, thereby creating a substantially closed circulatory system, and means for transferring heat from the conduit means thereby condensing the vapor to liquid form.

12. Means for moving a cooling fluid as recited in claim 11, further providing second micro pump means positioned within the conduit means for improving fluid circulation within the closed system.

13. Means for moving a cooling fluid as recited in claim 12, where the fluid is a mixture of about 50 percent each of nonafluoroisobutylether and nonafluorobutylether.

14. Means for moving a cooling fluid as recited in claim 12, where the fluid is selected from fluids having low electrical conductivity and dielectric constants in the range of 2 to 100.

15. Means for moving a cooling fluid, said moving means comprising a surface comprising an insulating substrate selected from the group consisting of silicon, quartz ceramic and sapphire, and interleaved first and second arrays of substantially parallel linear microelectrodes positioned on the surface, the moving means further including means for applying a sufficiently high non-reversing electromotive potential between the first and second arrays to create a polarization effect on the fluid, the first array thereby having a positive electrical potential with respect to the second array and the second array having a negative electrical potential with respect to the first array, whereby fluid is caused to flow along the lines of the microelectrodes.

16. Means for moving a cooling fluid, said moving means comprising a surface and interleaved first and second arrays of substantially parallel linear microelectrodes positioned on the surface, each microelectrode having a thickness, a width and a separation distance, and further providing that the thickness of the microelectrodes is between 0.3 $\mu$m and 10 $\mu$m, the width between 2 $\mu$m and 50 $\mu$m and the distance between adjacent microelectrodes between 2 $\mu$m and 100 $\mu$m, the moving means further including means for applying a substantially constant non-reversing electromotive potential between the first and second arrays, the first array thereby having a positive electrical potential with respect to the second array and the second array having a negative electrical potential with respect to the first array.

17. Means for moving a cooling fluid as recited in claim 16 further providing a microelectrode thickness of 0.3 $\mu$m, a width of 10 $\mu$m and a substantially uniform distance between adjacent microelectrodes of 20 $\mu$m.

18. Means for moving a cooling fluid as recited in claim 17, further providing that the distance between microelectrodes varies over the length of the interleaved array.

19. Means for moving a cooling fluid as recited in claim 18 further providing that the interleaved array includes a first end and a second end, confining means including an inlet and an outlet for channeling fluid flow from the array first end to the array second end, and further providing that the distance between adjacent array microelectrodes nearest the fluid inlet is greater than the distance between adjacent array microelectrodes nearest the fluid outlet.

20. Means for moving a cooling fluid, said moving means comprising a surface and interleaved first and second arrays of substantially parallel linear microelectrodes positioned on the surface to form an interleaved array, the interleaved array having a first end adjacent the end of the first array and a second end adjacent the end of the second array, the moving means further including means for applying a non-reversing electromotive potential between the first and second arrays, whereby fluid is caused to flow along the lines of the microelectrodes, away from the first array end and toward the second array end.

21. Means for moving a cooling fluid as recited in claim 20, further providing that the applied electromotive potential is substantially constant.

22. Means for moving a cooling fluid as recited in claim 20 further providing that the distance between microelectrodes varies over the length of the interleaved array.

23. Means for moving a cooling fluid as recited in claim 20 further providing that the interleaved array includes confining means including an inlet and an outlet for channeling fluid flow away from the array first end toward the array second end.

24. Means for moving a cooling fluid as recited in claim 23 further providing conduit means external of the moving means for connecting the fluid inlet and the fluid outlet, thereby creating a substantially closed circulatory system.

25. Means for moving a cooling fluid as recited in claim 24 further providing that the surface includes a heated portion and that the cooling fluid is volatile and traverses the heated portion and that a fraction of the cooling fluid is vaporized by the heated portion and further providing means for transferring heat from the conduit thereby condensing at least a portion of the vapor to a liquid.

26. Means for moving a cooling fluid, said moving means comprising a surface and interleaved first and second arrays of substantially parallel linear microelectrodes alternately positioned on the surface to form an interleaved array, the moving means further including means for applying a sufficiently high non-reversing electromotive potential between the first and second arrays to create a polarization effect on the fluid, the first array thereby having a positive electrical potential with respect to the second array and the second array having a negative electrical potential with respect to the first array, whereby fluid is caused to flow along the lines of the microelectrodes, and enclosing means for channeling fluid flow along the microelectrode lines.

* * * * *